United States Patent Office 2,758,049
Patented Aug. 7, 1956

2,758,049

IODINE DISSOLVED IN AN AQUEOUS SOLUTION OF POLYACRYLIC ACID

Jack B. Dienna, Rydal, Pa., assignor to Rohm & Haas Company, Philadelphia, Pa., a corporation of Delaware No Drawing. Application June 1, 1953,
Serial No. 358,969

3 Claims. (Cl. 167—17)

This invention deals with compositions comprising iodine and an aqueous solution of a polymer of carboxylic acid of the formula $CH_2=CHCOOH$. These compositions are effective antiseptic, disinfecting and sanitizing agents.

The disinfecting action of iodine has long been recognized. Efforts have been directed toward utilizing this action in an efficient manner and at the same time toward avoiding or overcoming at least some of the objectionable properties of iodine. Various solubilizers and solvents have been proposed for this purpose.

It has now been discovered that elemental iodine is taken up by aqueous solutions of polyacrylic acid to form an iodine complex which is peculiarly effective as a bacteriostatic and bactericidal agent even in the presence of organic contaminants. These complexes have exceptionally low mammalian toxicity and advantages in odor, staining and irritation.

An aqueous solution containing 10% to 50% by weight of a polyacrylic acid is treated with iodine in an amount of about 1% to about 10% or more of the weight of the acid. If desired, iodine in excess may be added to the aqueous solution and the resulting mixture is agitated until the required level of iodine has been taken up. The mixture may then be filtered to remove free iodine. These operations are conveniently carried out at a temperature between 20° and 40° C.

The useful concentrations of polyacrylic acid depend in part upon the polymer size. Polyacrylic acids can be formed varying greatly in molecular size, which may conveniently be evaluated in terms of the viscosity of an aqueous solution, a 5% solution being generally suitable. Polymers giving viscosities in aqueous 5% solution between one and 100 centistokes at 100° F. have been prepared. With high viscosities, high concentrations of acid are not practical. It is preferred, therefore, that polyacrylic acids be used giving viscosities in aqueous 5% solutions from about 2 to about 10 cs. at 100° F. These polymers are preferably handled in 15% to 40% concentrations.

Some typical preparations of the iodine complexes of this invention are presented in the following illustrative examples, parts being by weight.

Example 1

There are mixed 400 parts of an aqueous solution containing 25% of a polyacrylic acid giving an aqueous 5% solution with a viscosity of 2.5 cs. at 100° F. and 7.5 parts of iodine. The mixture is stirred for 24 hours to give a brown solution of the complex of iodine and polyacrylic acid.

When this solution is examined for its germicidal capacity by the Cantor-Shelanski method with a dilution to 200 p. p. m. of iodine, *Salmonella typhosa* being used as the test organism and whole milk at 1% as the contaminant, there is no survival of the organism even after ten increments at either 15 seconds or 30 seconds.

Example 2

There are mixed 100 parts of an aqueous 40% solution of a polyacrylic acid, which at 5% in water gives a viscosity at 100° F. of 2.0 cs., and 2.5 parts of iodine. The mixture is stirred for 24 hours to give a brown solution.

When evaluated by the Cantor-Shelanski method, this solution is found highly bactericidal. At 200 p. p. m. of total iodine, there is no survival after 15 or 30 seconds even after 10 increments.

Example 3

There are mixed 1.2 parts of iodine and 100 parts of an aqueous 15% solution of a polyacrylic acid, which in aqueous 5% solution gives a viscosity of 27 cs. at 100° F. The mixture is stirred at about 30° C. for 24 hours to give a brown solution.

When this solution is examined for its germicidal capacity by the Cantor-Shelanski method at a dilution giving 200 p. p. m. of iodine there is no survival even after 10 increments at either 15 seconds or 30 seconds. There is no survival 30 seconds after addition of the total inoculum. In comparison tests it is observed that survival is found after the fifth increment where the same level of iodine dissolved in an alkylphenoxypolyethoxyethanol is used as a standard.

Example 4

In the same way there are mixed 2.25 parts of iodine and 200 parts of an aqueous 15% solution of a polyacrylic acid, an aqueous 5% solution of which has a viscosity of 9.1 cs. at 100° F. This solution tested at 200 p. p. m. of iodine, likewise permits 10 increments in the Cantor-Shelanski method without any survival of the test organism.

Adequate sanitizing properties have been observed for the above composition and others like it so long as color can be noted in the use solutions. These iodophors give, therefore, natural indicator solutions.

Example 5

There are mixed 100 parts of an aqueous solution containing 24% of a polyacrylic acid, an aqueous 5% solution of which has a viscosity of 2.8 cs. at 100° F., and 2.5 parts of iodine. The mixture is stirred for about 18 hours and filtered. Analysis of the solution shows 2.07% of iodine or 8.04% of iodine based on polyacrylic acid.

In germicidal capacity tests at a level of 50 p. p. m. of iodine, this composition permits no survival of *Salmonella typhosa* for four increments at 15 or 30 seconds. At the fifth increment survival is 0.004% at 30 seconds. This is in contrast to many iodine complexes which permit 100% survival at the third increment when tested at 50 p. p. m. of iodine.

The compositions prepared above are not only effective in the presence of organic contaminants, as has been illustrated, but also in cold water and in hard waters. The compositions are useful for premise disinfectants, for sanitizing glassware and crockery and for like purposes. They are low in odor and in staining properties. They are stable, retaining their effectiveness indefinitely.

I claim:

1. As a new composition, an aqueous solution containing between 10% and 50% of a water-soluble polyacrylic acid dissolved therein and having dissolved therein iodine in an amount of 1% to 10% of the weight of said acid.

2. As a new composition, an aqueous solution of iodine and a water-soluble polyacrylic acid which in aqueous 5% solution gives a viscosity of 2 to 10 centistokes at 100° F., there being 10% to 50% of the polyacrylic acid dissolved in said solution and the iodine dissolved therein being 1% to 10% of the weight of the acid.

3. As a new composition, an aqueous solution of iodine and a water-soluble polyacrylic acid which in aqueous 5% solution gives a viscosity of 2 to 10 centistokes at 100° F., there being 15% to 40% of the polyacrylic acid dissolved in said solution and the iodine dissolved therein being 1% to 10% of the weight of the acid.

References Cited in the file of this patent

UNITED STATES PATENTS

| | | |
|---|---|---|
| 2,066,105 | Hagedorn et al. | Dec. 29, 1936 |
| 2,077,298 | Zelger | Apr. 13, 1937 |

OTHER REFERENCES

West: Journal of Chemical Physics, 1947, page 689.

Middendorf: Medizin und Chemie, Verlag Chemie SMBH, 1942, pages 573–584.

Miller et al.: Journal of the Chemical Society, London, July 1951, page 1933.

Chem. and Engineering News, February 19, 1951, page 664.

Chemical Week, December 22, 1951, pages 19 and 20.